(12) United States Patent
Webb et al.

(10) Patent No.: US 10,472,034 B1
(45) Date of Patent: Nov. 12, 2019

(54) HYBRID ENERGY HARVESTING SYSTEM FOR THERMAL-POWERED UNDERWATER VEHICLE

(71) Applicant: Teledyne Instruments, Inc., Thousand Oaks, CA (US)

(72) Inventors: Douglas C. Webb, Falmouth, MA (US); Andrey K. Morozov, N. Falmouth, MA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 16/284,501

(22) Filed: Feb. 25, 2019

(51) Int. Cl.
  *B63G 8/08* (2006.01)
  *F03G 7/05* (2006.01)
  *F03B 13/20* (2006.01)

(52) U.S. Cl.
  CPC ............... *B63G 8/08* (2013.01); *F03B 13/20* (2013.01); *F03G 7/05* (2013.01); *B63B 2209/14* (2013.01); *B63B 2209/18* (2013.01)

(58) Field of Classification Search
  CPC ... B63G 8/08; B63B 2209/14; B63B 2209/18; F03B 13/20; F03G 7/05; F03G 13/20
  See application file for complete search history.

(56) References Cited

U.S. PATENT DOCUMENTS

| | | | |
|---|---|---|---|
| 5,291,847 A | 3/1994 | Webb | |
| 6,138,604 A * | 10/2000 | Anderson | B63G 8/08 114/332 |
| 7,431,474 B2 | 10/2008 | Mah | |
| 8,689,556 B2 | 4/2014 | Jones et al. | |
| 2007/0227138 A1 * | 10/2007 | Carrott | F02G 1/043 60/520 |
| 2013/0218355 A1 * | 8/2013 | Lazaris | F03G 6/00 700/291 |
| 2017/0373311 A1 * | 12/2017 | Salehi-Khojin | H01M 4/38 |

OTHER PUBLICATIONS

Meyers et al., "The Vapor Pressure of Liquid and Solid Carbon Dioxide", National Bureau of Standards, Collection NISTJournalofResearch; NISTresearchlibrary; fedlink; Americana, Digitizing sponsor NIST Research Library, Contributor NIST Research Library, vol. 10, No. 3, pp. 381-412, 1933, Research Paper 538 (RP538).

* cited by examiner

Primary Examiner — Stephen P Avila
(74) Attorney, Agent, or Firm — M.J. Ram and Associates

(57) ABSTRACT

A hybrid energy harvesting system for powering underwater vehicles having at least one thermal engine, at least one of a solar or a wave energy harvester, and a battery which stores electric energy produced by the harvesters. The energy harvesters keep the battery charged and thereby expand an underwater vehicle's operational areas to high latitudes and shallow water. Multiple thermal engines employing different phase-change materials can be used to expand the vehicle's working temperature range and thus allow it to operate over a larger area. An electric motor powered by the battery and a pump driven by the motor can be used to pump hydraulic fluid between the accumulators and external bladders of the thermal engines to cause the vehicle to descend and ascend when the thermal gradient to which the vehicle is subjected is insufficient.

16 Claims, 4 Drawing Sheets

HYBRID ENERGY HARVESTING SYSTEM FOR THERMAL-POWERED UNDERWATER VEHICLE

BACKGROUND OF THE INVENTION

Field of the Invention

This invention relates generally to unmanned underwater vehicles, and more particularly to thermal-powered underwater vehicles.

Description of the Related Art

Autonomous floats and underwater gliders are principal instruments for global ocean monitoring. Thousands of floats and hundreds of underwater gliders currently continuously measure deep-water parameters in the world's oceans and transmit data through satellite communication to a computer data center. Floats can operate in the ocean for a few years, gliders for a few months, limited only by battery capacity. Though these vehicles need only a few watts of energy for operation, they need it continuously over long periods of time.

Vehicles that operate in the ocean interior for extended missions are generally powered by expensive high-performance batteries. Total battery energy is limited by vehicle weight, volume, speed, and buoyancy, as well the mission's energy requirements for propulsion, measurements, control, navigation, communications, etc. Recovering a vehicle at sea to replace a drained battery is expensive and difficult, requiring the availability of a suitable ship, often in a remote location where weather may limit operations.

The development of a method to harvest thermal energy in areas with suitable thermal gradients resulted in a major advance in ocean observational capability. For example, U.S. Pat. No. 5,291,847 to Webb describes an underwater glider vehicle which employs a "thermal engine" as its means of propulsion. However, areas with thermal gradients large enough to support thermal energy harvesting are limited to very deep water at latitudes from 0° to 50°. In shallow water and in polar or high latitude areas, temperature differences are insufficient to support thermal harvesting. Thus, gliders with thermal engines cannot operate worldwide.

A thermal power generator intended for an underwater vehicle uses a phase change material (PCM) whose density varies with temperature is described in U.S. Pat. No. 8,689,556. The density changes are employed to inflate and deflate an external bladder, which affects the buoyancy of the vehicle. A weakness of this design is that if an inadequate thermal charge results in inadequate inflation of the external bladder, the propulsion system stops working and cannot be restored; a single inadequate thermal cycle thus disables the vehicle. This can occur when the vehicle moves into an area with an inadequate gradient or into a shallow area where the vehicle cannot reach deep cold water (typically 800-1000 meters deep).

One known thermal engine design uses a gas-accumulator charged to a very high pressure as its primary energy storage means. However, this is not safe for transportation, and is not easy to deploy because a high pressure compressor is needed to charge the accumulator.

SUMMARY OF THE INVENTION

A hybrid energy harvesting system for a thermal-powered underwater vehicle is presented which overcomes the problems noted above.

The energy harvesting system described herein expands the range and endurance of thermal-powered underwater vehicles by adding the capability to harvest energy from solar and wave sources, and by making a rechargeable battery the main energy storage means for the vehicle. The use of rechargeable battery as the main energy storage means is more efficient than storing energy in a gas-accumulator as was done in earlier prototypes, as it allows energy to be stored from different sources not limited by those mentioned herein. In addition these innovations will allow cost-saving launch of the vehicle in shallow water rather than at remote deep-water sites, and they will allow shipping of the vehicle without a full charge of high pressure gas in the accumulator, which also facilitates laboratory testing. The system comprises at least one thermal engine, at least one of a solar energy or a wave energy harvester, and a battery which stores electric energy produced by the energy harvesters. Using these additional sources of energy keeps the battery charged and thereby expands operational areas for underwater vehicles to high latitudes and shallow water.

The present energy harvesting system includes at least one thermal engine, but preferably comprises first and second thermal engines employing respective and different phase-change materials (PCMs), such as a vapor-liquid PCM and a liquid-solid PCM. This operates to expand the vehicle's working temperature range and thus allow it to operate over a larger area.

Each thermal engine preferably comprises at least one chamber containing a PCM, at least one external bladder, a high-pressure accumulator, a low-pressure accumulator, and an arrangement of valves coupled to the chambers, the bladders, and the high- and low-pressure accumulators. The thermal engine is arranged such that hydraulic fluid is pumped between the accumulators and the bladders as the PCMs expand and contract in response to water temperature, so as to cause the vehicle to descend and ascend.

The present energy harvesting system preferably also includes an electric motor powered by the battery, and a pump driven by the motor which can be used to pump hydraulic fluid and charge the gas-accumulator, which may be used to pump fluid into external bladder so as to cause the vehicle to descend and ascend, when the thermal gradient to which the vehicle is subjected is insufficient to cause the vehicle to descend and/or ascend using only the PCMs.

These and other features, aspects, and advantages of the present invention will become better understood with reference to the following drawings, description, and claims.

DETAILED DESCRIPTION OF THE INVENTION

Figure 1:
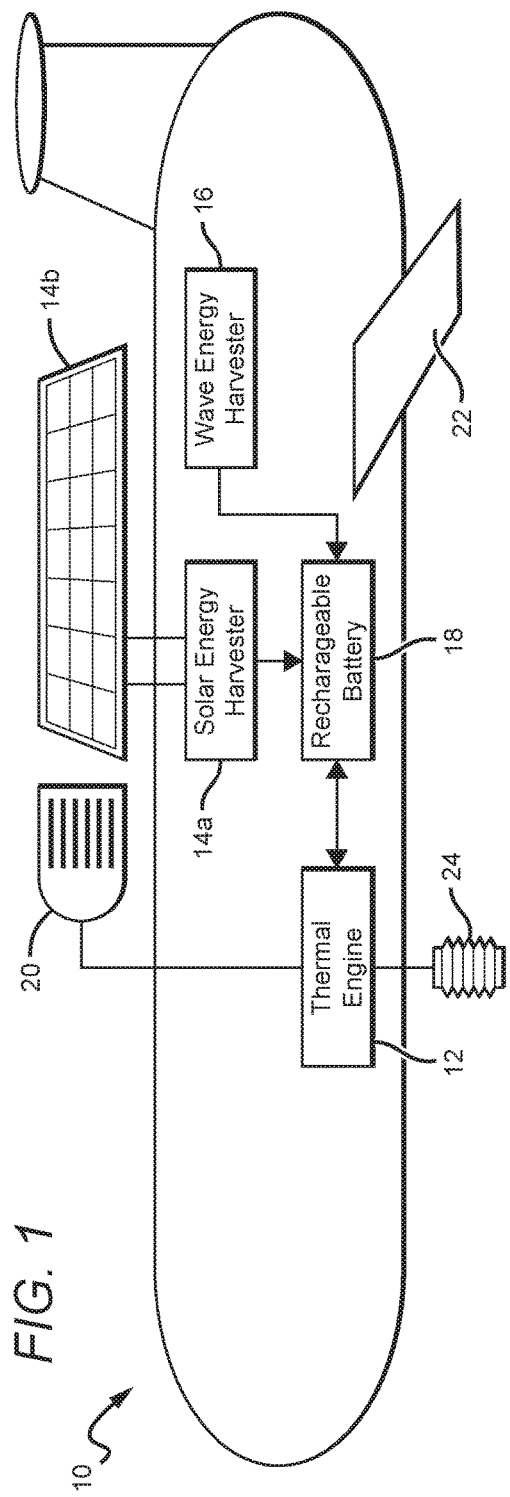
FIG. 1 is a block diagram of one possible embodiment of a hybrid energy harvesting system per the present invention.

The present hybrid energy harvesting system expands the range and endurance of thermal-powered underwater vehicles by adding the capability to harvest energy from solar and/or wave sources. Vehicles such as gliders and profilers designed to make repeated vertical descent-ascent cycles powered by thermal engines require thermal gradients that occur only in deep water in latitudes from 0° to 50°. In shallow water, wave energy is constantly available worldwide (maximal between latitudes of 30° to 60°), and solar power ubiquitously during daylight hours (maximum solar power is most available in low latitudes). Use of these additional sources of energy and making a rechargeable battery the main energy storage means can expand operational areas for underwater vehicles to high latitudes and shallow water in areas where thermal gradients are inadequate.

In addition, the energy harvesting system described herein can use, for example, two thermal energy generators with different PCMs which exhibit different forms of phase transformation, such as liquid-solid and vapor-liquid. This expands working temperature range and thus allows the vehicle to operate in a larger area.

The system may be upgraded with a motor and a pump, which can pump oil to an accumulator when the charge is inadequate at the sea surface, and can pump oil into an external bladder if the pressure in the accumulator is smaller than the external water pressure in deep water. In addition, in an area with a strong thermal gradient, surplus thermal energy may be converted to electric energy and stored in the battery by using the pump as a hydraulic motor and the motor as a generator.

Greater use of energy drawn from the ocean can increase the endurance and decrease the operations costs of underwater vehicles. All ocean energy originates from the sun. Ambient energy is most directly harnessed through the use of solar panels when floats or gliders are located on the sea surface and the solar energy can be transformed to electricity. Oceans cover more than 70% of Earth's surface, making them the world's largest solar collectors. Only 15% of the total solar input to the ocean is retained as thermal energy. The differential heating of the atmosphere generates wind, whose energy is transferred to the water through surface friction, forming waves. The waves store this energy as potential energy of the mass displaced and kinetic energy of the water motion. Wave energy can be considered a concentrated form of wind energy. The average densities of ocean energy sources vary, as follows:

Solar energy: 100-200 W/m2
Wind energy: 400-600 W/m2
Wave energy: 2-3 kW/m2

Variability and distribution of these forms of energy are also very different. All forms of ocean energy, notably solar, thermal, and wave energy, can potentially generate electricity. However, the efficiency of this transformation can be very low. Solar and wave energy offer maximum potential for efficient use of ocean energy. The sun's heat warms the surface water, and the temperature difference between surface and deep water creates thermal energy. Sea surface temperature can exceed 25° C. in tropical latitudes, while 1 km below surface, the water temperature is between 5 and 10° C.

While ocean thermal energy is harvestable mostly in the tropics between 0° and 35°, wave energy is greatest between latitudes of 30° and 60° (the so-called "Roaring Forties"). Solar energy can be a good supporting source in high latitudes during the polar day. One goal of the present hybrid energy harvesting system is to expand its operational area. As noted above, this is achieved by harvesting wave and/or solar energy in addition to ocean heat and storing it in a battery for use anywhere, even in areas without a suitable thermal gradient, or adequate solar or wave energy. The hybrid energy harvesting system can power underwater vehicles such as ocean gliders and profilers to make repeated vertical descent-ascent cycles. The power system can also be used to supply hotel electric loads, i.e., control, navigation, measurement, communication, etc., from environmental energy saved in the batteries carried on board. This increased harvesting of ocean energy can enable extended (in principal, indefinite) endurance. When thermal gradient, solar, or wave energy is not available, the battery may provide all propulsion and hotel energy required.

The basic system concept for the present hybrid energy harvesting system is shown in FIG. 1, which is suitably employed in an underwater vehicle 10. The system includes at least one thermal engine 12, at least one of a solar energy harvester 14a, 14b or a wave energy harvester 16, and a rechargeable battery 18 which stores electric energy produced by the harvesters; the battery is arranged to at least power the hotel electric loads for vehicle 10.

Solar panels 14b would typically be placed on a top of vehicle 10, such as on the wings 22 and/or main body of a glider, to feed power to solar energy harvester 14a which in turn charges battery 18. The solar energy harvester may be used during daylight hours and can be useful in shallow water or in high latitudes where heat gradient differential is inadequate. However, for best performance, the vehicle must be on or near the surface for long periods during daylight hours. The solar panels 20 would typically requires ~0.1 square meters, which can practically produce only a few tens of watts in a day. The solar energy harvester is reasonably efficient in low altitudes, less so in high latitudes.

The thermal engine has been used for many years to propel underwater vehicles such as gliders by changing vehicle buoyancy. Heat is absorbed from the warm surface water and rejected to the cold deep water during the vehicle's transit through the thermocline. This causes a change of state in a PCM that results in a change in its volume. The resulting PCM volume changes the vehicle's buoyancy, enabling it to ascend and descend at a useful speed. This variable buoyancy provides vehicle propulsion.

Thermal engine 12 preferably comprises at least one chamber 20 which contains a PCM, and at least one external bladder 22; additional components common to thermal engines are discussed below. In brief, the PCM changes state with the ambient temperature, causing a hydraulic fluid (not shown) to flow between chamber 20 and external bladder 22, thereby affecting the buoyancy of the vehicle.

Energy provided by the solar and/or wave energy harvesters 14a/14b, 16 is stored in battery 18; the system might also be arranged such that thermal engine 12 can provide energy to the battery (discussed below). The battery typically powers all other vehicle systems, including control, measurement, communication, and navigation. The battery is preferably pre-charged to allow initialization of the system at the beginning of a sea trial. As noted above, previous thermal engines used a pre-charged gas-accumulator as its primary energy storage means. Elimination of a pre-charged high-pressure gas-accumulator allows for safer transportation and deployment.

Figure 2:
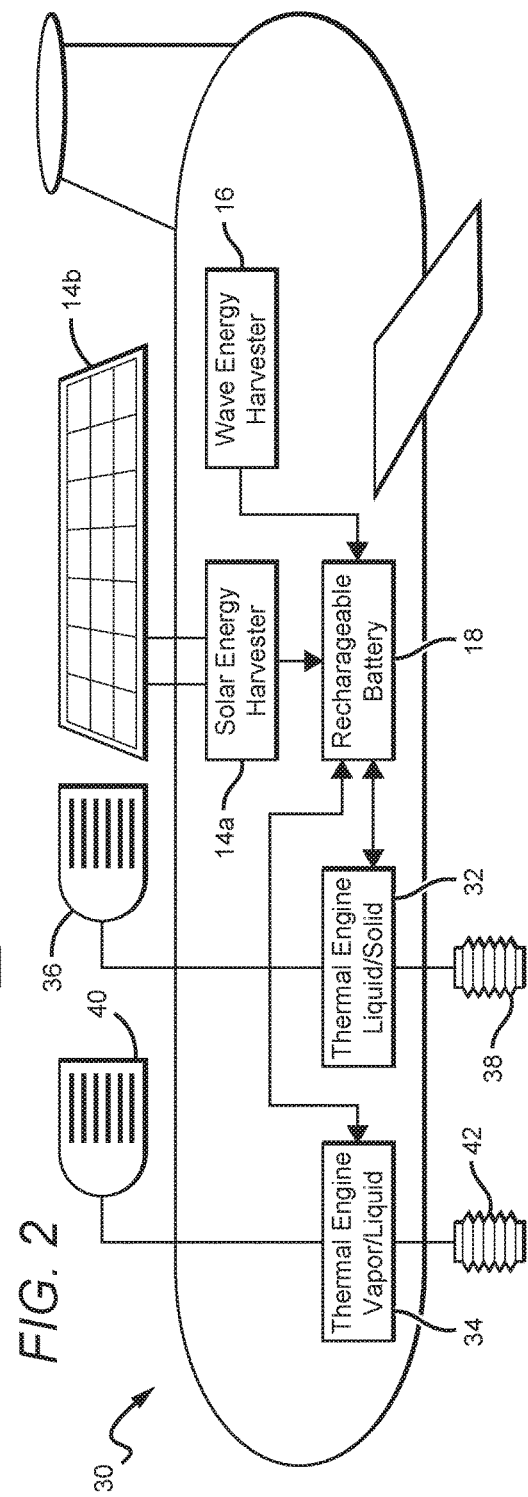
FIG. 2 is a block diagram of another possible embodiment of a hybrid energy harvesting system per the present invention.

The present hybrid energy harvesting system may include more than one thermal engine, each having its own type of PCM. An example is shown in FIG. 2. As before, an underwater vehicle 30 includes at least one of a solar energy harvester 14a, 14b, or a wave energy harvester 16. Here, however, the hybrid energy harvesting system includes first and second thermal engines 32 and 34 employing respective PCMs, with the first and second PCMs being different. For example, the PCM for thermal engine 32 might be a liquid-solid PCM, and the PCM for thermal engine 34 might be a vapor-liquid PCM. Thermal engine 32 preferably comprises at least one chamber 36 which contains its PCM and at least one external bladder 38, and thermal engine 34 preferably comprises at least one chamber 40 which contains its PCM and at least one external bladder 42.

Though the design of thermal engines 32 and 34 are similar, their operational properties are different. Using a vapor-liquid PCM is very efficient for shallow depths, where buoyancy is altered dramatically due to changes in water temperature and salinity. In addition, a thermal engine employing a vapor-liquid PCM can be easily adapted to the local temperature range by changing the vapor pressure. On the other hand, a liquid-solid PCM is very efficient in deep water. The combination of these two engines results in a supersum (super summing, over simple combination) effect. The combined engines will remain highly efficient in deep water, will have large buoyancy change near the surface, and can adapt to a variable range of surface temperatures.

Chambers 36, 40 and external bladders 38, 42 are shown as separated. However, the combining of some system components is possible. For example, the system can have one joint external bladder. In general, any thermal engine may be replaced with a combination of two or more thermal engines working in parallel. Each of the engines may have a different PCM; for example, vapor-liquid with different saturated pressure or liquid-solid with different melting temperature. The engines with different types of PCM may have separated external oil bladders and internal gas-accumulators. A combined two-phase system (i.e., using dual PCMs as described above) supports a larger working temperature range and therefore can power a vehicle over a larger area of coverage. A system with multiple PCMs will also be more efficient. A thermal engine with a liquid-solid PCM is preferred in deep water, because it contracts on freezing and expands on melting and exerts high pressure that is well matched to deep-sea pressures. However, any other PCM or any other combination of thermal engines with different PCMs can be employed. A hydraulic amplifier (not shown) may be used to match the pressure for a vapor-liquid PCM. Except for this, systems with different PCMs are practically the same.

Figure 3:
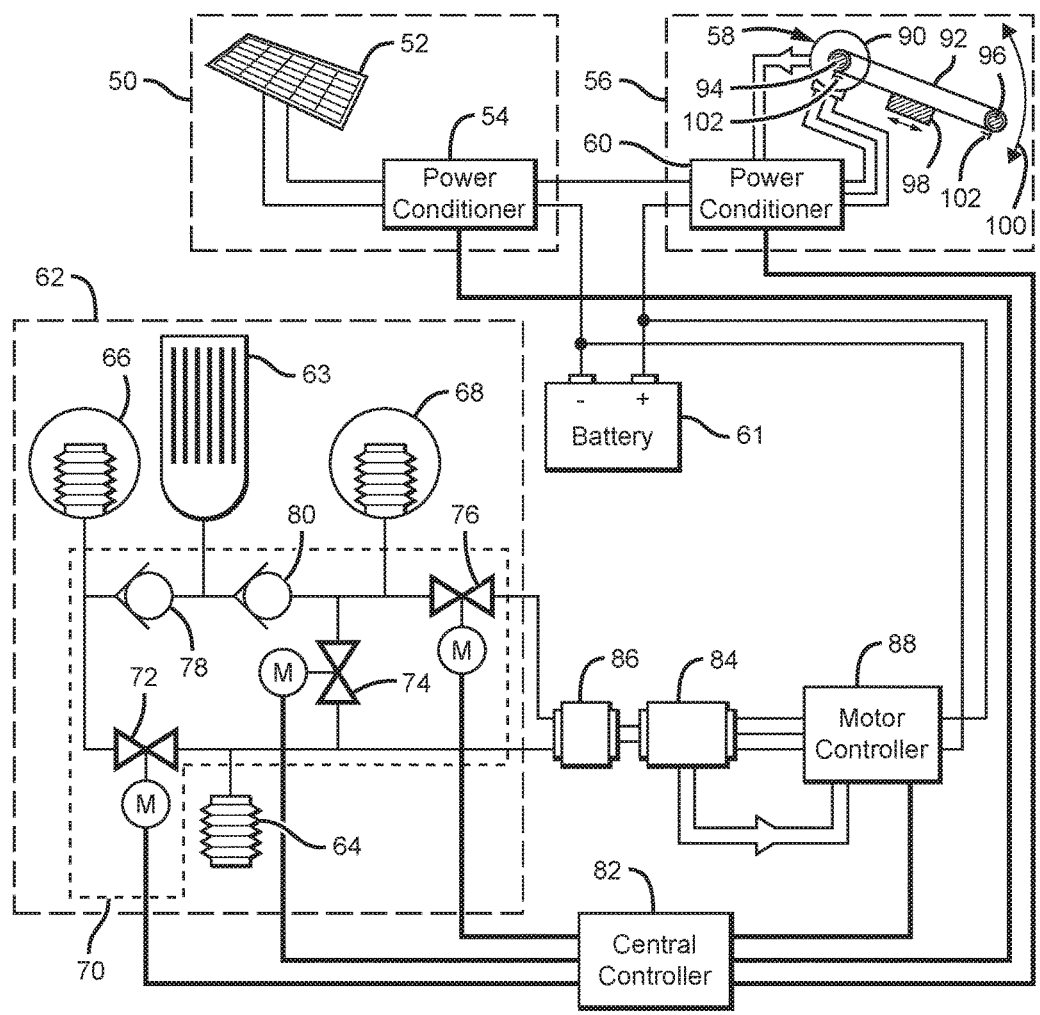
FIG. 3 is a block/schematic diagram of one possible embodiment of a hybrid energy harvesting system per the present invention.

A schematic view of one possible embodiment of the present hybrid energy harvesting system is shown in FIG. 3, which employs one thermal engine. This exemplary system includes a solar energy harvester 50, which includes solar panels 52 and would typically also include a power conditioner 54. The system also includes a wave energy harvester 56, which includes an electric generator mechanism 58 and would typically also include a power conditioner 60. Power from power conditioners 54 and 60 is provided to a rechargeable battery 61.

The energy harvesting system also includes a thermal engine 62 comprising a chamber 63 containing a PCM, an external bladder 64, a low-pressure accumulator/internal bladder 66, and a high-pressure accumulator 68. An arrangement of valves 70 (including control valves 72, 74, and 76) is coupled to the chamber, the bladder, and the high- and low-pressure accumulators; a pair of check valves 78, 80 would typically be employed as shown. The thermal engine is arranged such that hydraulic fluid is pumped between the accumulators and the external bladder as the PCM expands and contracts in response to water temperature, so as to cause the vehicle to descend and ascend. A central controller 82 would typically be used to operate valves 70 (including 72, 74, 76) (which are preferably motor-driven and electrically controlled) to effect this functionality.

A thermal engine such as that illustrated in FIG. 3 harvests and stores oil at high pressure, and uses some of the oil under high pressure to create the buoyancy required for propulsion. The vehicle operating cycle starts at the surface in warm water with the PCM enclosed in chamber 63 and external bladder 64 inflated with oil. The warm PCM expands, and accumulator 68 is charged with oil at high pressure. Vehicle descent begins when controller 82 opens valve 72 and oil from external bladder 64 passes through valve 72 into the internal bladder 66. As the vehicle descends to cold water, the PCM freezes and shrinks, drawing oil from internal bladder 66. Ascent begins when controller 82 opens valve 74 to let the oil, stored at high pressure, flow from high pressure accumulator 68 to inflate external bladder 64.

More specifically, each descent-ascent includes four stages of the thermodynamic cycle. External thermal energy is harvested by heat flowing into and out of the PCM in chamber 63, as the PCM expands on melting and contracts on freezing. The resulting energy is transmitted around the system by the transfer fluid, typically hydraulic oil. Chamber 68 is an energy storage accumulator in which the transfer fluid is pressurized, typically with nitrogen, at a pressure greater than the maximum external ocean pressure. When the vehicle is in thermal equilibrium in warm surface water, the nitrogen is compressed, external bladder 64 is inflated, and the PCM is expanded. Check valve 78 is closed and the transfer liquid flows through check valve 80 and fills accumulator 68. The descent begins when valve 72 opens and external bladder 64 vents fluid into internal bladder 66. The pressure differential for this flow is created by maintaining the pressure in internal bladder 66 slightly below atmospheric pressure. As the vehicle reaches cold water, heat flows out of the working fluid, which freezes, contracts, and draws in glycol from the internal bladder 66 through check valve 78. Ascent begins with the opening of valve 74, the pressurized glycol in accumulator 68 moves to external bladder 64, and the vehicle changes from negative to positive buoyancy. The working PCM is frozen and has minimum volume. As the vehicle ascends to warm water, heat flows into the working PCM, which melts and expands, and glycol flows to recharge accumulator 68 through check valve 80. The vehicle arrives at the surface in the same state as it started, and the cycle is complete.

FIG. 3 shows the simplicity of the design. Valves 72, 74, 76 control the operational timing, including stops at intermediate depths. The two check valves (78, 80) present the only additional dynamic complexity. The low efficiency, approximately 3% due to the small temperature differences, is compensated by the nearly unlimited source of ocean thermal energy. To facilitate timely heat transfer, the working fluid is preferably contained in external tubes. Heat transfer may be facilitated by adding conductive radial washers or random spirals to the working fluid. At the initial position on the sea surface, the pressure in chamber 63 should be at maximum.

Harvesting thermal energy requires sufficient thermal gradient. Some areas have no suitable thermal gradient, and the gas-accumulator charge will be inadequate. To use the thermal engine for propulsion in areas where there no adequate thermal charge, a valve 76, a motor 84, and a pump 86 are added to the system. These components make propulsion possible in the areas without a suitable temperature gradient. When the thermal gradient is too small or the thermal charge is marginal, the vehicle changes to hybrid operation using these components. Power is drawn from battery 61 to drive motor 84 to rotate hydraulic pump 86, which pumps hydraulic fluid between accumulators 68 and external bladder 64 so as to cause the vehicle to descend and ascend. A motor controller 88 would typically be interposed between battery 61 and motor 84.

There are two different methods for charging a thermal engine. At the surface, when the accumulator has only marginal thermal charge, central controller 82 opens valve 76, and motor 84 and pump 86 transfer liquid from external bladder 64 to hydraulic accumulator 68. In deep water, when pressure in accumulator 68 is smaller than the external pressure, pump 86 draws oil from internal bladder 66, and accumulator 68 inflates external bladder 64 via valve 74. In this way, the vehicle can continue to operate despite an unsuitable thermal gradient, drawing energy from battery 61. Note that electric motor 84 might be a motor/generator which can be driven by pump 86 to generate electricity to charge battery 61; this is discussed in more detail below. This hybrid system will be able to operate anywhere in the ocean using thermal energy when available and electrical energy, stored in battery 61, when required. Worldwide operation is made practical.

These innovations also allow cost-saving launch of the vehicle in shallow water rather than at remote deep-water sites, and allow shipping of the vehicle without a full charge of high-pressure gas in accumulator 68, which also facilitates laboratory testing.

Other operational advantages provided by the present hybrid energy harvesting system include deployment and recovery almost anywhere. Shipping without a full charge of high-pressure gas in accumulator 68 is safer and easier. This system can be even more efficient if pump 86 is operated in reverse as a motor, and motor 84 is reversed to work like a generator. Now, to increase buoyancy, the system opens valve 76 and transfers liquid glycol through pump 86 into external bladder 64. Pump 86 rotates motor-generator 84 and returns part of the energy back to battery 61.

Figure 4A:
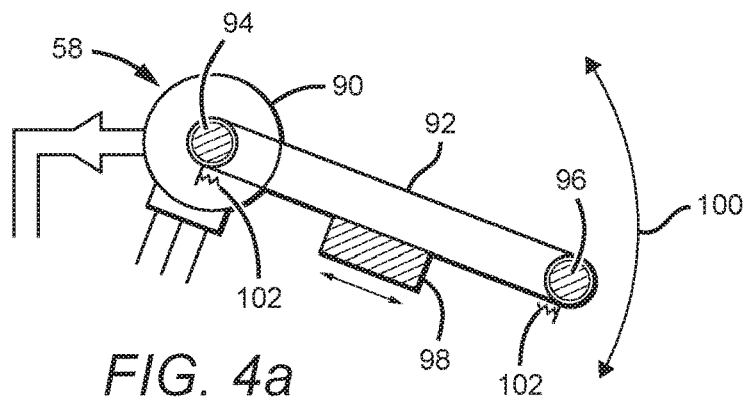
FIGS. 4a-4c are diagrams of electrical generator mechanisms as might be used to harvest wave energy for a hybrid energy harvesting system per the present invention.
Figure 4B:
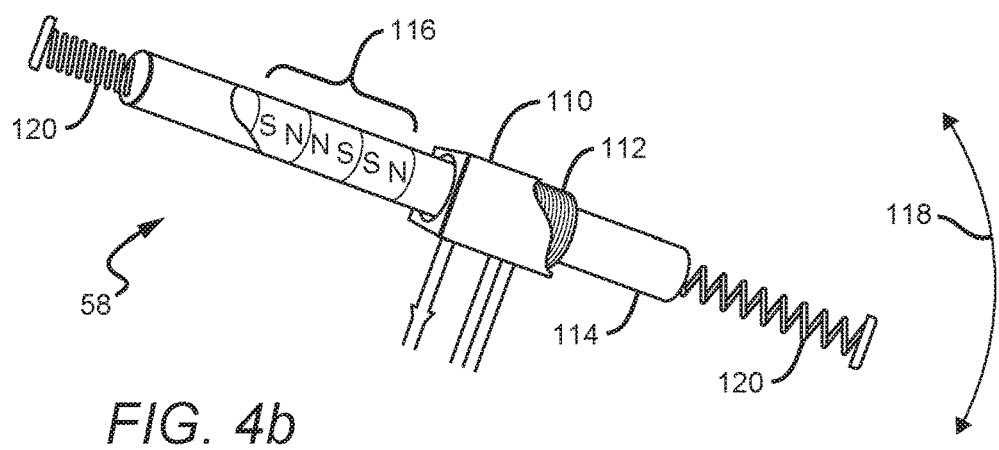
Figure 4C:
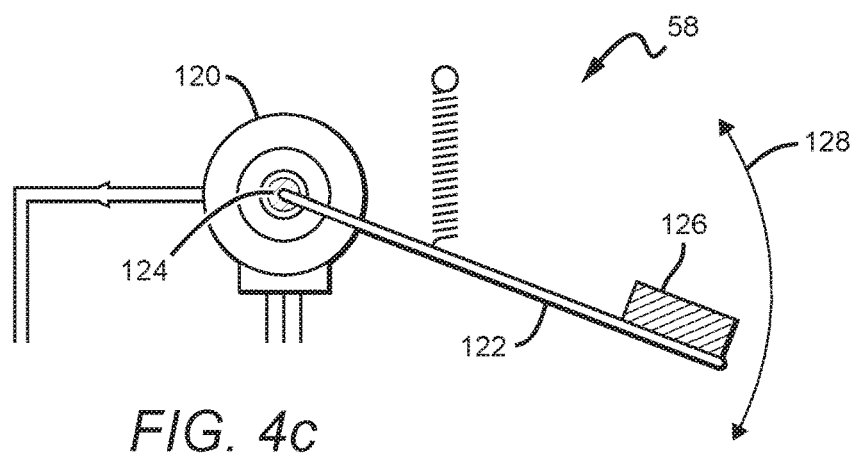

Wave energy is available at all times and all latitudes, and there are several ways to capture it. Ocean wave size depends on wind speed, the length of time the wind blows, and the size of the area affected by the wind. Wind waves grow into open ocean swells. The period of the wind waves is less than 10 seconds, while swells have greater periods. Wind waves generally incline the vehicle (glider) when it is on the surface, and swells move a vehicle (glider) vertically. FIGS. 4*a*, 4*b*, and 4*c* show three typical electrical generator mechanisms (58) that might be used to convert wave energy to electricity. The mechanism of FIG. 4*a* generates energy when the vehicle changes slope, and the mechanism of FIG. 4*b* exploits vehicle acceleration.

In FIG. 4*a*, the electrical generator mechanism 58 comprises an electrical generator 90, a circular belt 92 coupled between a drive shaft 94 on the generator and a roller 96 remote from the drive shaft, such that the drive shaft rotates when the circular belt moves. A weight 98 is coupled to belt 92 which moves the belt in response to random wave-induced inclinations 100 of the vehicle. The mechanism might also include first and second end springs 102 adjacent to drive shaft 94 and roller 96, respectively, and in the path of moving weight 98, to restrict the range of movement of the weight.

As shown in FIG. 3, electrical generator 90 is connected to battery (61), preferably through a power conditioner (60), which increases the load on the electro-mechanical generator at the end of the maximum acceptable shift. Battery 61 might be affixed to belt 92 and serve as weight 98. Electric generator 90 might be implemented as a reversible electric motor with a four-quadrant driver. In this case, in deep water, motor/generator 90 could be used to change the pitch and control vehicle descent or ascent by shifting the weight 98 along the vehicle axis.

The system shown in the FIG. 4*b* shows how a linear motor-generator can be used to harvest wave energy from random vehicle body inclination. Here, the electrical generator mechanism 58 comprises a linear electrical motor/generator 110 which includes a static magnetic coil 112, and a heavy rod 114 which supports an array of permanent magnets 116 which move through the magnetic coil in response to wave-induced inclinations 118 of the vehicle. The mechanism might also include first and second end springs 120 coupled to opposite ends of rod 114 to restrict the range of movement of the rod. Since magnetic coil 112 is static, the system avoids any moving contacts or flexible wiring. A driver and power conditioner could be employed similar to that discussed above for the system shown in FIG. 4*a*, and used to increase the load at the edges of the maximum acceptable shift. If a reversible variant of a generator/motor and four-quadrant controller are used, the system could be used to control vehicle pitch in deep water.

The system shown in FIG. 4*c* generates power by using vertical displacement of the vehicle caused by wave swell motion. The electrical generator mechanism 58 comprises an electrical generator 120, a lever arm 122 coupled at one end to a drive shaft 124 on the generator, and a weight 126 (which could simply be battery 61) coupled to the lever arm. When lever arm 122 is shifted up and down by the inertia of weight 126 due to wave swell motion 128, the arm rotates drive shaft 124, preferably through a gear with a limited angle. Electrical generator 120 could be implemented as a motor-generator with a four-quadrant driver. In this case, in reverse application, the motor 120 can shift the weight 126 to adjust the center of vehicle mass.

Any combination of the systems shown in FIGS. 4*a*-4*c* can make the wave energy harvester 56 sensitive to inclination or to vertical displacement of the vehicle.

Figure 5:
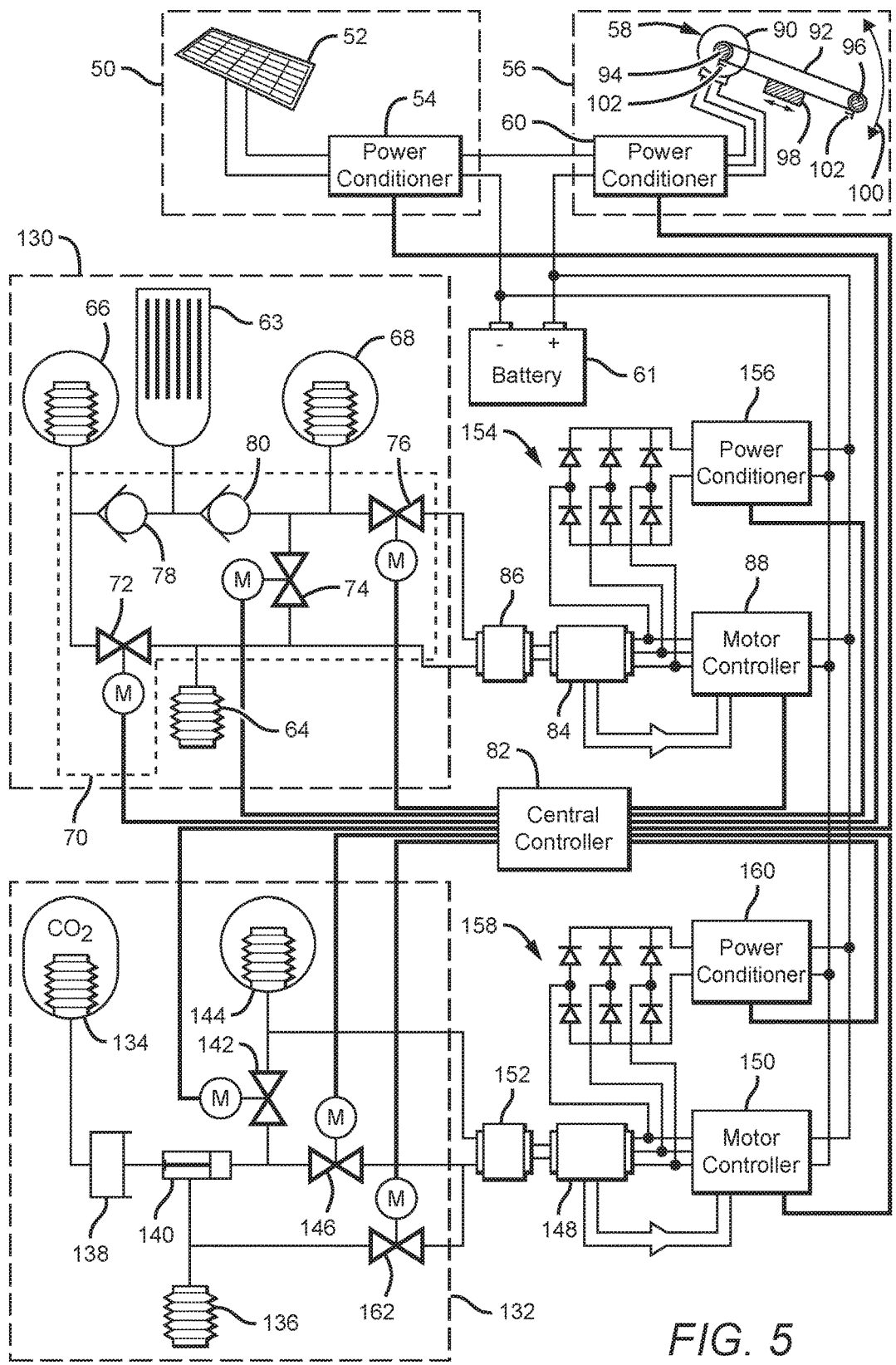
FIG. 5 is a block/schematic diagram of another possible embodiment of a hybrid energy harvesting system per the present invention.

Another possible implementation of the present hybrid energy harvesting system is shown in FIG. 5. This configuration is similar to that shown in FIG. 3, with some additional components added to provide further functionality. For example, the arrangement shown in FIG. 5 can be used when hydraulic accumulator 68 is overcharged. By opening valves 72 and 76 surplus liquid glycol can be transferred through valves 72 and 76 and pump 86 to accumulator 66. Assuming motor 84 is a motor-generator, pump 86 will rotate the motor-generator and generate energy that can be stored in battery 61.

The system shown in FIG. 5 can generate electric energy from solar, wave and thermal sources as well as harvest energy with thermal engines using two different PCMs: in this exemplary embodiment, a first thermal engine 130 uses a liquid-solid PCM and a second thermal engine 132 uses a vapor-liquid PCM Chamber 63 in thermal engine 130 contains the liquid-solid PCM materials, and a chamber 134 in thermal engine 132 contains the vapor-liquid PCM materials. Each engine has its own external bladder 64, 136; however, it is possible for some system components to be combined. For example, the system can have only one joint external bladder.

The principle of vapor-liquid PCM engine 132 is similar to the liquid-solid PCM engine 130. External thermal energy is harvested by heating the PCM in chamber 134. When the PCM evaporates the pressure increases and when the PCM condenses the pressure decreases. The hydraulic oil transfers this pressure through two hydraulic pistons 138 and 140, connected with external bladder 136, and a valve 142 into an energy storage accumulator 144. In accumulator 144, the transfer fluid is pressurized with nitrogen at a pressure greater than the maximum external ocean pressure. The system operates as a non-adiabatic engine, which remains in thermal equilibrium with the surrounding water. If the vehicle is on the ocean surface, the PCM is in thermal equilibrium with the warm water and is at a high pressure. Descent begins when valve 142 opens and pressure from PCM chamber 134 shifts hydraulic pistons 138 and 140 to the right, compressing gas in accumulator 144 and pumping oil from external bladder 136 into the left part of the piston 146.

Thermal engine 132 preferably includes a motor/pump arrangement like that of engine 130, with a motor or motor/generator 148 controlled by a motor controller 150 driving a pump 152. If the thermal gradient can't deliver adequate accumulator charge, motor 148 and pump 152 may be used to pump oil into gas-accumulator 144 through open valve 146, or to pump it back to start ascent from the deep water. The design shown in the FIG. 5 allows this motor/pump arrangement to be used in the inverse order as well. If instead of opening valve 142, the central controller 82 opens a valve 146, the hydraulic liquid flows through pump 152, which causes motor-generator 148 to generate power which can be saved in rechargeable battery 61. Power generated in this way is preferably rectified and conditioned before being provided to battery 61; this is illustrated for thermal engine 130 with a rectifier 154 and a power conditioner 156, and for thermal engine 132 with a rectifier 158 and a power conditioner 160. When the piston 140 shifts to the right, the transfer liquid flows from external bladder 136 into piston 140 and the vehicle starts descending. When descent starts valves 142 and 146 close and remain closed to the end of the descent.

When valve 142 is opened the equation for the balance of the pressure has the form: $P_a S_a = (P_{pcm} S + P_w S_w)$, where $P_a$ is the pressure in gas-accumulator 144, $P_{pcm}$ is the pressure in PCM chamber 134, $P_w$ is the water pressure, $S_a$ and $S_w$ are the areas of piston 140 from the accumulator and external bladder sides, and S is the area of piston 138.

The pressure in the accumulator 134 is determined by the volume of the gas and its temperature (Avogadro's law):

$$P_a V_a / T = \text{const}$$

The saturated pressure of the PCM depends on the state of the material. If the PCM in chamber 134 is, for example, carbon dioxide ($CO_2$): the pressure at the sea surface at 20° C. is equal to $P_c = 60.0 \cdot 10^5$ Pa, and in deep water at 5° C. $P_c = 39.53 10^5$ Pa.

After some time in deep water, vehicle temperature equalizes with the water temperature, at which point the PCM gas condenses and its pressure drops. Ascent begins, and when valves 142 or 146 open again, the gas-accumulator moves piston 140 back to the left position and fluid is vented into the external bladder 136. Vehicle buoyancy increases and it starts lifting to the surface.

The depth to which a practical system can dive is now illustrated (with $CO_2$ used as PCM is in the example above). The parameters of the buoyancy changing system are:

$$S_a = S_w = 2 \cdot 10^3 \text{ m}^2; \; S = 8.1 \cdot 10^3 \text{ m}^2; \; V_a(T=20° \text{C.}) = 0.01 \text{ m}^3$$

The equation for the pressure equilibrium gives pressure in the gas-accumulator 134 at the surface at 20° C. and in deep water at 5° C.:

$$P_a(T=20° \text{C.}) = 24.26e \cdot 10^6 \text{ Pa};$$

$$P_a(T=5° \text{C.}) = 25.91 \cdot 10^6 \text{ Pa};$$

The volume changes from 10 L at the surface to 10.8 L at a depth of 500 m. The buoyancy of 0.8 L may be used to lift the vehicle to the sea surface.

The range of the operating temperatures depends on the equilibrium pressure of the PCM gas and can be changed by changing the pressure inside the gas-accumulator 134. This can be done by redistributing a volume of the transfer fluid between sections of the hydraulic piston 140 and shifting the operating position of that piston. This can be achieved by opening a valve 162 and pumping transfer liquid in or out of the piston 140. This makes the system adaptable to the changes in the surface temperature and expands the operating area of the thermal engine.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A thermal-powered underwater vehicle having associated hotel electric loads, comprising:
    at least one thermal engine which is powered by thermal gradients;
    at least one of a solar energy or a wave energy harvester; and
    a battery which stores electric energy produced by said at least one harvester and thereby expands the operational area of said underwater vehicle when said thermal gradients are inadequate to power said thermal engine;
    said battery arranged to power said vehicle's hotel electric loads.

2. A thermal-powered underwater vehicle having associated hotel electric loads, comprising:
    at least one thermal engine;
    at least one of a solar energy or a wave energy harvester; and
    a battery which stores electric energy produced by said at least one harvester;
    said battery arranged to power said vehicle's hotel electric loads;
    said at least one thermal engine comprising first and second thermal engines employing respective phase-change materials, said first and second phase-change materials being different.

3. The vehicle of claim 2, wherein said first and second phase-change materials comprise a vapor-liquid phase change material and a liquid-solid phase change material, respectively.

4. The vehicle of claim 3, wherein first and second thermal engines further comprise:
    first and second chambers, respectively, said first and second chambers containing said first and second phase-change materials, respectively; and
    first and second external bladders.

5. A thermal-powered underwater vehicle having associated hotel electric loads, comprising:
    at least one thermal engine;
    at least one of a solar energy or a wave energy harvester; and
    a battery which stores electric energy produced by said at least one harvester;
    said battery arranged to power said vehicle's hotel electric loads;

wherein said at least one thermal engine comprises:
at least one chamber, each of which contains a phase-change material;
at least one external bladder;
a high-pressure accumulator;
a low-pressure accumulator; and
an arrangement of valves coupled to said at least one chamber, said at least one external bladder, said high pressure accumulator, and said low pressure accumulator;
said at least one thermal engine arranged such that hydraulic fluid is pumped between said accumulators and said at least one external bladder as each of said phase-change materials expands and contracts in response to water temperature so as to cause said vehicle to descend and ascend.

6. The vehicle of claim 5, further comprising:
an electric motor powered by said battery; and
a pump driven by said electric motor and arranged to pump said hydraulic fluid between said accumulators and said at least one external bladder so as to cause said vehicle to descend and ascend.

7. The vehicle of claim 6, wherein said electric motor is activated when the thermal gradient to which said vehicle is subjected is insufficient to cause said vehicle to descend and/or ascend using only said phase-change materials.

8. The vehicle of claim 6, wherein said electric motor is a motor/generator which can be driven by said pump to generate electricity to charge said battery.

9. The vehicle of claim 6, further comprising a motor controller coupled between said electric motor and said battery.

10. The vehicle of claim 1, further comprising at least one power conditioner coupled between said at least one energy harvester and said battery.

11. A thermal-powered underwater vehicle having associated hotel electric loads, comprising:
at least one thermal engine;
at least one of a solar energy or a wave energy harvester; and
a battery which stores electric energy produced by said at least one harvester;
said battery arranged to power said vehicle's hotel electric loads;
wherein said at least one of a solar energy or a wave energy harvester comprises a wave energy harvester, comprising:
an electrical generator;
a circular belt coupled between a drive shaft on said generator and a roller remote from said drive shaft, such that said drive shaft rotates when said circular belt moves; and
a weight coupled to said belt which moves said belt in response to wave-induced inclinations of said vehicle.

12. The vehicle of claim 11, further comprising first and second end springs adjacent to said drive shaft and said roller and in the path of said moving weight to restrict the range of movement of said weight.

13. A thermal-powered underwater vehicle having associated hotel electric loads, comprising:
at least one thermal engine;
at least one of a solar energy or a wave energy harvester; and
a battery which stores electric energy produced by said at least one harvester;
said battery arranged to power said vehicle's hotel electric loads;
wherein said at least one of a solar energy or a wave energy harvester comprises a wave energy harvester, comprising:
an electrical linear motor/generator which includes a static magnetic coil; and
a rod which supports an array of permanent magnets which move through said magnetic coil in response to wave-induced inclinations of said vehicle.

14. The vehicle of claim 13, further comprising first and second end springs coupled to opposite ends of said rod to restrict the range of movement of said rod.

15. A thermal-powered underwater vehicle having associated hotel electric loads, comprising:
at least one thermal engine;
at least one of a solar energy or a wave energy harvester; and
a battery which stores electric energy produced by said at least one harvester;
said battery arranged to power said vehicle's hotel electric loads;
wherein said at least one of a solar energy or a wave energy harvester comprises a wave energy harvester, comprising:
an electrical generator;
a lever arm coupled at one end to a drive shaft on said generator such that said drive shaft rotates when said lever arm moves; and
a weight coupled to said lever arm which moves said lever arm in response to wave-induced inclinations of said vehicle.

16. The vehicle of claim 15, wherein said electrical generator is a motor-generator, arranged such that said motor-generator can be operated to shift the position of said weight to adjust the center of vehicle mass.

* * * * *